Patented Feb. 7, 1950

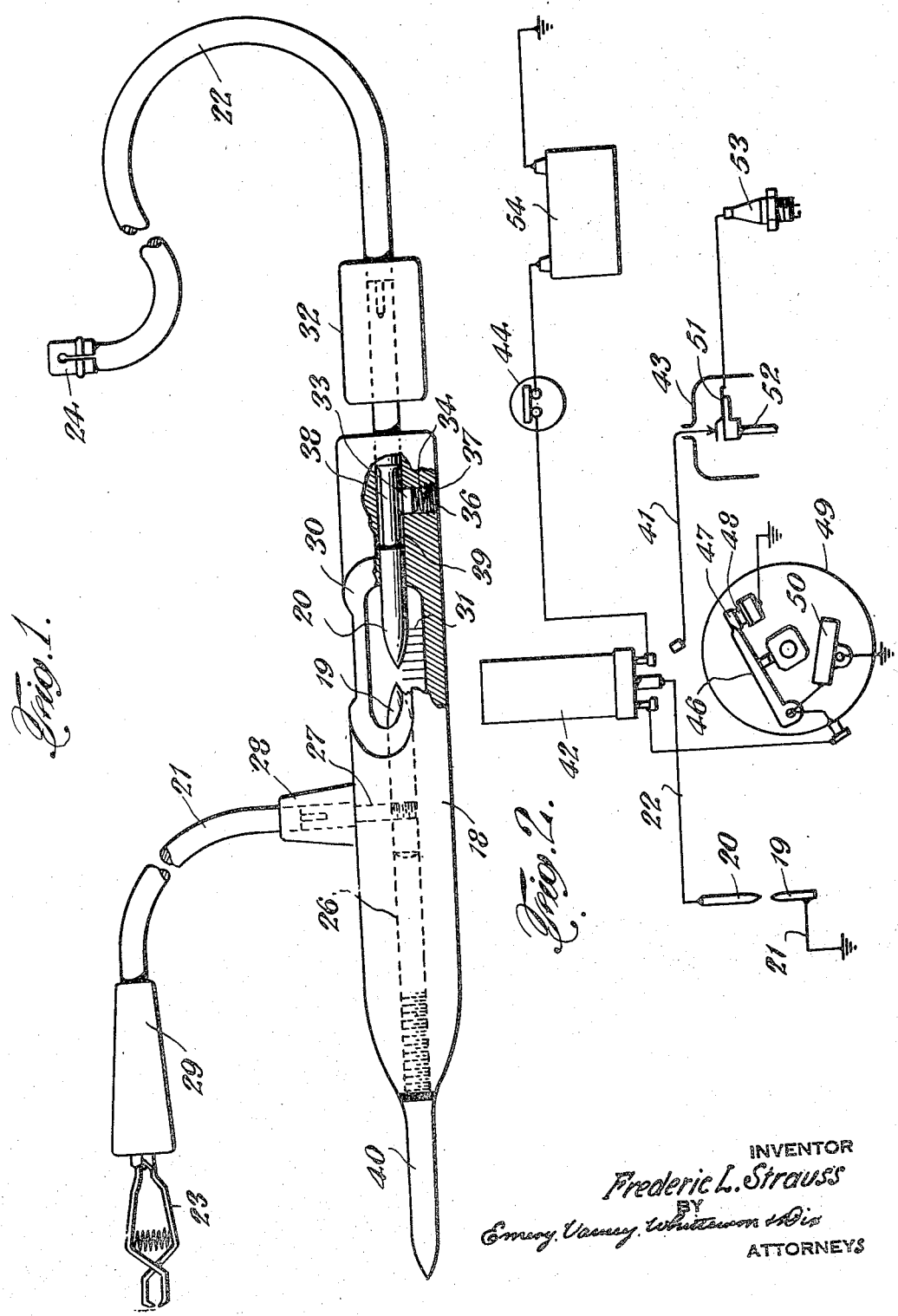

2,496,823

UNITED STATES PATENT OFFICE 2,496,823

IGNITION SYSTEM TESTER

Frederic L. Strauss, Woodhaven, N. Y.

Application April 3, 1947, Serial No. 739,221

1 Claim. (Cl. 175—183)

The invention herein relates to an improved tester for use in electrical transmission systems.

More particularly the invention refers to a novel testing device for quick and ready use in accurately checking over the ignition system of an automobile to quickly learn where ignition troubles are located.

The improved device herein is also adaptable to be used as a "trouble shooter" in the electrical apparatus portion of any internal combustion engine.

A further feature of this invention is the provision of a simple testing device of light weight and small size and is provided with one or more parts that makes it easy to manipulate parts of the ignition apparatus so that the testing may be done thoroughly and completely. Also the device allows for the viewing of the size of spark, if any. The device assists in indicating where trouble may be located.

Another feature of the invention is the provision of a novel form of coil and cable tester adapted for quick and efficient use on high tension coils and cables of an ignition system of an internal combustion engine.

A still further advantage of the novel tester is that it is very simple of construction, it is easy to manipulate, and it is manufactured in very simple form at comparatively little expense, and the tester is so constructed that it is well insulated so that the user does not get shocked electrically.

An additional feature of this improved tester is that it is usable to make several satisfactory tests while the engine is idle. Other tests are readily made when the engine is being started, and while running.

Other features and advantages of the invention will be apparent in the reading of the detailed description of the device and its operation as given below and when taken in connection with the accompanying drawings, wherein:

Fig. 1 is a view partly in section of the device, and

Fig. 2 is a wiring diagram of an automobile ignition system with the tester connected therein.

Referring now particularly to Fig. 1, there is illustrated a tester in which there is provided a body or casing and two electrodes with flexible leads connected thereto and a mechanical means as part of the tester which is used to move parts of the apparatus of the ignition system of an internal combustion engine. This mechanical means may or may not be electrically conducting, but it is desired that it will be made of material which will conduct electricity. Preferably, it is not electrically connected to either of the electrodes.

The body or casing 18 of the tester may be of any desired form or shape and be made of any desirable material but is here shown as a relatively long round casing which is preferably made of electrical insulating material, such as wood or plastic or the like.

Mounted in the casing are the two electrodes 19 and 20 and extending from them are flexible leads 21 and 22 with electrical terminals 23 and 24. It is preferred that the two electrodes 19 and 20 shall be so mounted in the casing 18 that they may be moved toward and away from each other. In the construction here shown, the casing is provided with a longitudinal hole 26 which extends through the longer axis of the casing. The electrode 19 is assembled in the hole and receives an electrical conducting rod or conductor 27 which preferably is screw threaded into electrode 19, as shown in Fig. 1 and thereby holds the electrode firmly in a definite position in the casing. The flexible lead 21 engages the electrical conducting rod or conductor 27, as indicated in dotted lines, and it is desirable to place a rubber insulating boot 28 over this connection. Another insulating boot 29 is mounted on the free end of lead or high tension cable 21 so as to cover the connection between the lead and a gripping terminal 23.

The second electrode 20 is mounted in the other end of the casing 18 in the extension of hole 26 and extends to the outside of the casing 18. Electrode 20 is constructed to be moved back and forth toward electrode 19. The casing 18 is cut away as indicated at 30 so that it is easy to visually see any sparks which jump the gap between ends of the electrodes 19 and 20. It is desired to enlarge the hole 26 at the cut away part 30 as will be clearly noted in Fig. 1. Marks 31 are provided on the edge of the cut away portion 30, or in the interior of the casing 18 so that the distance between electrode 19 and 20 at any time is easily noted. When desired, these marks may have numbers placed beside them so as to indicate units of distance.

Where electrode 20 extends out of the casing 18, it is usually provided with an insulating handle 32 which preferably is positioned to cover the electrical joint of the electrode with the flexible lead or cable 22. This handle 32 makes it easy to move electrode 20 back and forth inside of the body or casing 18 so that the spark gap between the ends of the electrodes may be varied.

It is preferred to provide at least a partial resistance to the back and forth movement of electrode 20, and in this instance a shoe 33 is provided in opening 34 in the casing 18. A screw cap 36 and spring 37 are provided to always urge the shoe 33 against portion 38 of the electrode 20. Thus, this electrode will be maintained in any of its set or predetermined positions but may be moved to other positions with only a partial resistance. The portion 38 of the electrode 20 is preferably reduced in diameter, or may be provided with a channel 39 in which the shoe 33 extends. This channel or reduced diameter usually is of limited length, as indicated in Fig. 1 and thus the shoe prevents the electrode 20 from being pulled out of the casing 18.

As noted above, it is desired that this improved testing device have a mechanical means or element, here designated as a prod, for the purpose of moving or electrically "shorting" some of the apparatus of the ignition system of the internal combustion engine during the making of tests. It is preferred that such a means or element or prod be mounted so that it extends from some convenient part of casing 18. In the preferred form of structure of the tester herein illustrated, a prod 40 is provided and is mounted on casing 18 at one end thereof and preferably at the end opposite electrode 20. In the simple construction of a prod, it is desired to make it of electrical conducting material and to screw thread it into the hole 26. In this instance, the prod 40 and the two electrodes 19 and 20 are mounted in the longer axis of the casing 18.

This type of testing device has quite a large number of uses in making quick tests of ignition systems to determine what is wrong with the system of an automobile internal combustion engine. It has been found this preferred form of testing device with its prod 40, has been very helpful in making quick, efficient and accurate tests in automobiles to determine where ignition trouble resides. Some of these tests will now be described.

Referring now to Fig. 2 it will be noted that the high tension lead 41, which normally connects the coil 42 to the distributor cap 43, has been removed and the tester terminal 24 has been inserted in the coil 42 and the electrode 19 of the tester has been connected to a ground. The automobile ignition switch 44 is now closed and prod 40 is employed to move the distributor point arm 46 to move contact 47 away from stationary contact point 48. With this condition of the apparatus and the connection of the tester in the ignition system, the spark gap in the tester between electrodes 19 and 20 is observed. Normally, a spark should jump between the electrodes 19 and 20 when so electrically connected and with the spark gap at approximately 10 mm. In the event no spark shows, the ignition trouble may be due to faulty points. If now the prod 40 is moved so it engages the distributor body 49 and the arm 46, a spark should occur as the arm is "shorted" on to a ground. Therefore, the contacts or points 47 and 48 would be at fault. If no spark occurs under these tests, the trouble resides in either a condenser 50 or the coil 42.

The foregoing tests are usually made first and while the engine is idle.

Further tests are usually made by operating the starter and noting the operations under the load of starting the motor.

If now the engine is started and a weak or unsteady spark occurs between electrodes 19 and 20 while the starter is operating, it will denote a faulty starting motor, or a weak or defective battery or bad battery and motor connections, or possibly the trouble may be found in the engine having too heavy oil and being "gummed up" from waxes settling out of the oil. It is important to check a motor by operating the starter so as to determine whether there are loose connections. This is very often one of the first and usual troubles in an ignition system. With this improved tester these troubles "show up" very quickly.

There are several tests which are easily made with the motor running so as to indicate the operations of the ignition coil or the adjustment between the points or the operation of the spark plugs. In making such tests, the terminal 23 of the tester is connected to the distributor cap so that the coil will be required to operate through the electrodes 19 and 20 to rotor 51 which rotates on shaft 52 and connects in scheduled order to each of the spark plugs 53. In this manner the size of the spark between the points of the spark plugs will show for each of the spark plugs and it will be easily noted which one of the spark plugs is faulty. If the sparks are all very weak, then the fault usually resides in the coil of the ignition system. A battery 54 is shown as electrically connected in the ignition system between the ignition switch and the ground.

It will be appreciated that when the body or casing 18 is made of a plastic through which the electrodes 19 and 20 are visible that it will not be necessary to have a cut away portion 30 and the spark then will be viewable through the material. In the normal type of tester it is, however, desired that there be a cut away portion so that the ends of the electrodes may be cleaned, and modified, if desired. Also, it will be understood that with the type of cut away portion shown in Fig. 1, that there may be a plastic-like or Lucite cover placed over the opening 30. Such a cover may or may not be made to slide along the casing 18.

Also, it will be understood that it is possible to eliminate one of the flexible leads and have an electrical conducting element extending only a short distance from the casing 18 or even be flush therewith and use that conducting element for electrically connecting one of the electrodes in the ignition system to a portion of the apparatus of the ignition system by simply touching the element to an electrical part of the ignition system, while the other electrode would be connected preferably by the flexible lead to another part of the ignition system thereby conducting the tests which have already been indicated above.

Minor changes in the construction of the improved tester shown and described herein may be made as desired.

It further will be noted that a simple tester of low cost manufacture and of small size to allow easy and quick operations under the hood of an automobile are added advantages of this improved type of tester. It will be further noted that the mechanical means or prod portion of the tester allows for easy and quick testing of various parts of the apparatus while the engine remains idle. Many of the testers used to check ignition systems of automobiles do not provide such an advantageous addition and the improved device herein has shown itself to be very helpful and very successful and accurate in making these various tests and to complete such tests efficiently and quickly.

It will be understood that various modifications and changes may be made in the preferred form of the invention herein, and such modifications and changes are to be understood to be as part of this invention, as outlined in the following claim.

The invention claimed is:

In a tester for an ignition system, the combination of an insulating casing having a hole through its longer axis, said casing having a short length of said hole enlarged, said casing being cut away for a portion of its perimeter where said enlargement occurs, a first electrode mounted in said hole with one end extending into said enlarged portion and beneath said cut away portion of said casing, a conductor screw threaded into said electrode and extending to the outside of said casing at right angles to said electrode, a flexible high tension lead connected to said conductor, a spring operating clamp connected to the free end of said lead and adapted to engage a part of the apparatus of said ignition system, a second electrode mounted in the hole in said casing and having one end of said electrode extending into the enlarged part of said casing and beneath said cut away portion, said electrode adapted to be moved to and from the first electrode, markings beneath the cut away portion of said casing to indicate units of distance, said second electrode extending from said casing and having an insulating handle thereon for moving said electrode, a flexible high tension lead connected to the free end of said second electrode and having an electrically conducting terminal at the free end thereof, a part of said electrode within said casing being reduced in diameter for a short distance and forming shoulders at each end of said distance, a shoe mounted in said casing for engaging the reduced diameter portion of said electrode, a spring mounted on the other end of said shoe and being placed under compression whereby said shoe forms a resistance to the movement of said second electrode within said casing, and a metallic prod mounted in the free end of said casing but not in electrical contact with either of said electrodes.

FREDERIC L. STRAUSS.

REFERENCES CITED

The following references are of record in the file of this patent:

UNITED STATES PATENTS

| Number | Name | Date |
|---|---|---|
| 1,665,567 | Slifer | Apr. 10, 1928 |
| 1,735,593 | Zitzmann | Nov. 12, 1929 |
| 1,952,259 | Karr | Mar. 27, 1934 |
| 2,076,618 | Cooper | Apr. 13, 1937 |
| 2,213,297 | Zitzmann | Sept. 3, 1940 |